United States Patent [19]

Zahn et al.

[11] Patent Number: 5,556,604
[45] Date of Patent: Sep. 17, 1996

[54] METHOD AND APPARATUS FOR PURIFYING EXHAUST GASES FROM INTERNAL COMBUSTION ENGINES

[75] Inventors: Wolfgang Zahn, Ludwigsburg; Gunter Loose, Remseck; Axel Hirschmann, Goeppingen, all of Germany

[73] Assignee: Mercedes-Benz AG, Stuttgart, Germany

[21] Appl. No.: 396,958

[22] Filed: Mar. 1, 1995

[30] Foreign Application Priority Data

Mar. 3, 1994 [DE] Germany ............... 44 06 648.1

[51] Int. Cl.$^6$ .................................................. F01N 3/00
[52] U.S. Cl. .................. 423/213.7; 423/212; 423/213.2; 422/169; 422/170; 422/171; 422/177; 60/274
[58] Field of Search ................... 422/169, 170, 422/171, 177, 180, 222, 211; 60/299, 273, 274, 289; 423/210, 212, 213.2, 213.5, 213.7

[56] References Cited

U.S. PATENT DOCUMENTS

| | | | |
|---|---|---|---|
| 5,010,051 | 4/1991 | Rudy | 423/213.5 |
| 5,051,244 | 9/1991 | Dunne et al. | 423/212 |
| 5,113,651 | 5/1992 | Kotzan et al. | 60/274 |
| 5,235,956 | 8/1993 | Yoshizaki | 60/289 |

FOREIGN PATENT DOCUMENTS

| | | |
|---|---|---|
| 0387611 | 9/1990 | European Pat. Off. |
| 0410440 | 1/1991 | European Pat. Off. |
| 0427494 | 5/1991 | European Pat. Off. |
| 2208190 | 8/1973 | Germany. |
| 2554359 | 6/1977 | Germany. |
| 3337903 | 5/1985 | Germany. |
| 3642018 | 6/1987 | Germany. |
| 4205496 | 1/1993 | Germany. |

OTHER PUBLICATIONS

Patent Abstract of Japan, Japanese No. 4–287820, M–1371 Feb. 23, 1993, vol. 17/No. 92.

Primary Examiner—Robert Warden
Assistant Examiner—Hien Tran
Attorney, Agent, or Firm—Evenson, McKeown, Edwards & Lenahan, P.L.L.C.

[57] ABSTRACT

A method, and an apparatus for carrying out the method, for purifying exhaust gases from internal combustion engines is provided. The engines having a catalyzer system which includes a first catalyzer and at least one second catalyzer, arranged downstream of the first catalyzer, for the conversion of HC, CO and $NO_x$ exhaust gas constituents. Exhaust gases flow through both catalyzers during the entire operating period of the engine. The first catalyzer is suitable for at least the catalytic conversion of HC and CO exhaust gas constituents. In a first step of the method, the first catalyzer is operated over-stoichiometrically during the cold starting phase in order to reduce the HC and CO emissions and, in a second step of the method with $\lambda$-controlled stoichiometric exhaust gas composition, the catalytic conversion of the exhaust gas is at least largely de-activated and in the first catalyzer takes place in the second catalyzer. Substantially better endurance of the first catalyzer is attained for the same good reduction in the exhaust gas pollutants.

1 Claim, 1 Drawing Sheet

METHOD AND APPARATUS FOR PURIFYING EXHAUST GASES FROM INTERNAL COMBUSTION ENGINES

BACKGROUND AND SUMMARY OF THE INVENTION

The invention relates to a method for purifying gases from internal combustion engines and a apparatus for carrying out the method.

A known method, and an apparatus for carrying out the method, for purifying exhaust gases using a catalyzer system is described in Japanese Patent document JP 4-287 820 (A). This system includes a first catalyzer (in the exhaust gas flow direction) and at least one second catalyzer, arranged downstream of the first catalyzer, for the conversion of HC, CO and $NO_x$ exhaust gas constituents. Exhaust gases flow through both catalyzers during the entire operating period of the engine. The first catalyzer is at least suitable for the catalytic conversion of HC and CO exhaust gas constituents. In a first step of the known method to reduce the HC and CO emissions, the first catalyzer is operated over-stoichiometrically during the cold starting phase.

A method for purifying exhaust gases from internal combustion engines having a catalyzer system is likewise known from European Patent document EP 0 427 494 A2. This system includes a first catalyzer (in the exhaust gas flow direction) and a second catalyzer arranged downstream of the first catalyzer. The first catalyzer, which is configured as a starting catalyzer, is near the engine and has a lower starting temperature. The second catalyzer, which is configured as an under-body catalyzer, is remote from the engine. Both catalyzers have exhaust gases flowing through them during the entire operating period of the engine. Each of the two catalyzers is a conventional three-way catalyzer.

It is known from German Patent document DE 42 05 496 C1 to bypass the catalyzer near the engine, in order to protect against thermal overload when the starting temperature of a catalyzer which is remote from the engine is reached. However, this system is of a different generic type.

As general background, reference is also made to the publications DE 22 08 190 C3, DE 25 54 359 C2, DE 33 37 903 A1, DE 36 42 018 A1, EP 0 387 611 A2, EP 0 410 440 A1 and U.S Pat. No. 5,051,244.

A disadvantage of the known methods in the case of catalyzers, such as starting catalyzers, arranged near the engine, for example, is that very high thermal loading of the catalyzer occurs, considered over the entire operating period of the engine. This results in accelerated ageing of the catalyzer. The thermal loading is partly due to the relatively high heat quantity associated with the exhaust gas in the region near the engine. A further substantial contribution to the thermal loading, particularly in the case of a warm engine, is provided by the exothermal conversion of hydrocarbon (HC) and carbon monoxide (CO) exhaust gas constituents in conventional catalyzers near the engine. This conversion causes an average increase in temperature relative to the catalyzer inlet on the order of around 100° C. In small local catalyzer regions, furthermore, the increase in temperature is substantially larger so that this additional increase in temperature makes a decisive contribution to the accelerated ageing of the catalyzer near the engine in cases where the associated exhaust gas has a high exhaust gas temperature and a large quantity of heat.

A further disadvantage of known catalyzer systems, where the starting catalyzer near the engine can be optionally by-passed in order to protect the starting catalyzer from thermal overload in the warm engine condition, is the relatively complicated construction and expensive manufacture of such catalyzer systems, as well as the by-pass conduits and control devices.

The present invention is based on need for designing a method of the generic type, and an apparatus for carrying out the method, for purifying exhaust gases from internal combustion engines in a manner which is as simple and low-cost as possible and in such a way that a substantially better endurance of the catalyzer system is achieved for the same good reduction in the exhaust gas pollutants.

These needs are met according to the present invention by providing a method for purifying exhaust gases from internal combustion engines having a catalyzer system which includes a first catalyzer (in the exhaust gas flow direction) and at least one second catalyzer, arranged downstream of the first catalyzer, for the conversion of HC, CO and $NO_x$ exhaust gas constituents. The exhaust gases flow through both catalyzers during the entire operating period of the engine. The first catalyzer is suitable for at least the catalytic conversion of HC and CO exhaust gas constituents. In a first step of the method, the first catalyzer is operated over-stoichiometrically during the cold starting phase in order to reduce the HC and CO emissions. In a further step of the method with a λ-controlled stoichiometric exhaust gas composition, the catalytic conversion of the exhaust gas in the first catalyzer is at least de-activated and takes place in the second catalyzer.

One advantage of the method according to the present invention is the fact that, despite the permanent flow of exhaust gas through the first catalyzer (first in the exhaust gas flow direction), this catalyzer is subjected, during the entire engine operation, to a temperature which is, at a maximum, slightly above the exhaust gas temperature at the catalyzer inlet in the warm engine condition. As a consequence, the thermal loading of the first catalyzer (first in the exhaust gas flow direction) is considerably reduced and its endurance is therefore substantially improved. The higher endurance is advantageously achieved and in accordance with the invention in that the first catalyzer is only catalytically active in the cold starting phase with an over-stoichiometric exhaust gas composition, in a manner described in more detail below, and is largely catalytically inactive in the case of λ-controlled, stoichiometric exhaust gas composition (from attainment of operating temperature of the internal combustion engine).

A further advantage of the method according to the present invention is provided by a first catalyzer which is designed as an oxidation catalyzer and is deactivated according to the invention in the case of a controlled exhaust gas flow. This is because such a catalyzer also secures the three-way function of downstream three-way catalyzer in that the (de-activated) oxidation catalyzer lets the HC and CO pass chemically unaltered in the case of a λ-controlled exhaust gas flow and, by this means, makes these compounds available as auxiliary reaction partners in the three-way catalyzer.

A further advantage of the method according to the invention may be seen in the fact that the possibility of avoiding by-passing in the case of starting catalyzers near the engine makes structural simplification attainable and makes a substantial reduction in the manufacturing costs of the complete catalyzer system achievable.

By means of the apparatus, according to the invention for carrying out the method, and due to the prevention of or very great reduction in the alternate adsorption and desorption of oxygen in the first catalyzer (first in the exhaust gas flow direction), an exothermic conversion of HC and CO exhaust gas constituents is prevented or is very greatly reduced in the case of a $\lambda$-controlled stoichiometric exhaust gas composition even above the starting temperature of the first catalyzer. The exothermic conversion of HC and CO is prevented because compensation does not now occur by adsorption and desorption of oxygen for the pulsating concentrations of the exhaust gas components caused by the $\lambda$-control of the engine (rich and lean phases of the exhaust gas in the immediate vicinity of $\lambda=1$), as is necessary in the case of conventional catalyzers in order to maintain its "three-way effect" as for an exact $\lambda=1$. It is possible to dispense with the alternative adsorption and desorption of oxygen in the first catalyzer because, in the cold starting phase, this catalyzer operates without $\lambda$-control and with an excess of air and, therefore, sufficient oxygen for the oxidation of HC and CO is provided in the exhaust gas itself. In addition, a reduction of $NO_x$ during the cold starting phase is unnecessary because the quantity of it in the exhaust gas is negligibly small.

A particularly advantageous structural configuration of the apparatus according to the present invention for carrying out the method, and one which is preferentially suitable for strict emission requirements, is achieved by arranging the three catalyzers in series. This is due, on the one hand, to the reduction described above of the cold starting emissions by the starting catalyzer (three-way catalyzer or oxidation catalyzer) arranged near the engine and, on the other hand, by a very effective conversion of all three exhaust gas components $NO_x$, CO and HC in the warm condition of the engine. As already mentioned above, HC and CO are available in sufficient quantity, in the case of the warm engine, as auxiliary reaction partners for the catalytic reduction of $NO_x$ in the downstream second catalyzer because the first catalyzer has been de-activated. The second catalyzer is a three-way catalyzer optimized for the reduction of $NO_x$. The remaining HC and CO residues after the second catalyzer are converted in the oxidation catalyzer arranged downstream of the second catalyzer.

Other objects, advantages and novel features of the present invention will become apparent from the following detailed description of the invention when considered in conjunction with the accompanying drawings.

DETAILED DESCRIPTION OF THE DRAWINGS

Figure 1:
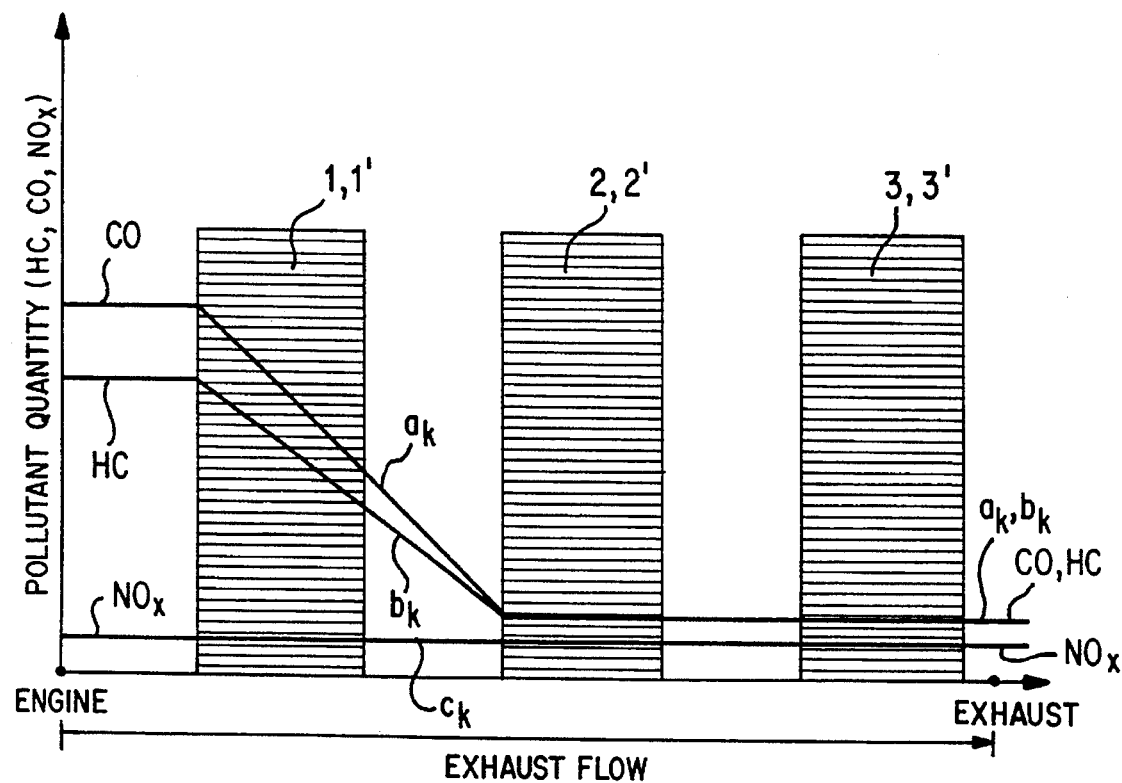
FIG. 1 is a graphical representation of the qualitative variation, during the cold starting phase of an internal combustion engine, of the exhaust gas pollutants HC, CO and $NO_x$ in the exhaust gas flow which is not $\lambda$-controlled and has over-stoichiometric exhaust gas composition, shown in the through-flow direction of an apparatus according to the invention for carrying out the method, which apparatus includes a catalyzer system with three catalyzers.
Figure 2:
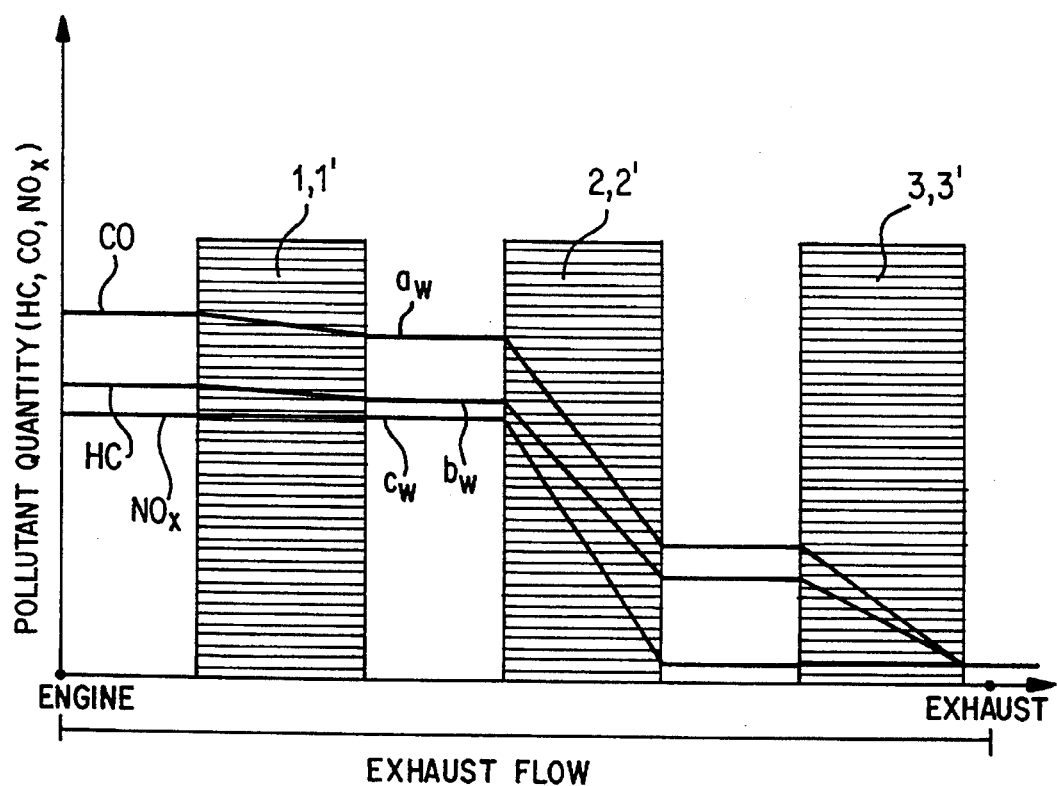
FIG. 2 is a graphical representation analogous to that of FIG. 1 of the qualitative variation of the exhaust gas pollutant quantities in the warm engine condition in the case of a $\lambda$-controlled exhaust gas flow with stoichiometric exhaust gas composition.

FIGS. 1 and 2 respectively show, in graphical representation, the qualitative variation of the exhaust gas pollutant quantities HC, CO and $NO_x$ in the through-flow direction of a catalyzer system with three catalyzers 1, 2 and 3 for purifying exhaust gases from an internal combustion engine. In these figures, Catalyzer 1 is a first catalyzer (first in the exhaust gas flow direction), Catalyzer 2 is arranged downstream of Catalyzer 1 and Catalyzer 3 is in turn arranged downstream of Catalyzer 2.

In order to simplify the representation, the individual catalyzers 1–3 are indicated adjacent to one another. Their actual arrangement is known in principle and, to the extent necessary for the description of the invention, follows in more detail from the following description.

FIG. 1 shows the qualitative variation of the pollutant quantities for carbon monoxide CO (Graph $a_k$), hydrocarbons HC (Graph $b_k$), and oxides of nitrogen $NO_x$ (Graph $C_k$) in the exhaust gas over the entire catalyzer system during the cold starting phase. In an analogous manner, FIG. 2 shows the qualitative variation of the pollutant quantities in the warm condition of the engine (Graphs $a_w$, $b_w$ and $c_w$ for CO, HC and $NO_x$, respectively).

In the embodiment example, described in more detail below, of the method according to the present invention and of the apparatus for carrying out the method, the first catalyzer 1 in the exhaust gas flow direction is a starting catalyzer 1', which is arranged near the engine (not shown), is configured as an oxidation catalyzer and, in accordance with the invention, is catalytically inactive in the case of $\lambda$-controlled exhaust gas composition. The catalyzer 2 is an underbody catalyzer 2', which is arranged remote from the engine and is designed as an $NO_x$- optimized three-way catalyzer, and the catalyzer 3 is arranged behind the catalyzer 2' in the exhaust gas flow direction and is designed as a conventional oxidation catalyzer 3'.

The invention is not, of course, limited to the embodiment example. Thus, the catalyzer 1 can also be configured as a three-way catalyzer arranged near the engine or can be configured, within a catalyzer casing having a plurality of catalyzers, as a first catalyzer (first in the exhaust gas flow direction) of the catalyzer system, the catalyzer casing itself being arranged either near the engine or remote from the engine. The catalyzer can also, for example, be configured as conventional three-way catalyzer.

The method according to the present invention is described below by means of the embodiment example and is considered from the warming up of the engine to the attainment of the warm operational engine condition.

1. Some seconds, after the beginning of the warming-up phase (rotation of the ignition key), the oxidation catalyzer 1' near the engine (or the first catalyzer in the exhaust gas flow direction) reaches its starting temperature. In a first step of the method, no $\lambda$-control of the exhaust gas flow takes place and the exhaust gas composition is over-stoichiometric so that only oxidation of HC and CO takes place, in a manner per se, in the catalyzer near the engine. The catalyzers 2' and 3' arranged remote from the engine have not yet reached their starting temperature so that the purified exhaust gas leaves the exhaust gas system without further catalytically supported chemical change (Graphs $a_k$–$c_k$ in FIG. 1).

2. On attainment of the operational warm engine condition, the three-way catalyzer remote from the engine has also reached its starting temperature (approximately 300°–350° C). In a second step of the method, the $\lambda$-control of the exhaust gas, known per se, is now initiated so that the stoichiometric composition of the exhaust gas ($\lambda=1$) is attained. In the case of a stoichiometric exhaust gas composition, the catalyzer 1' near the engine is now largely de-activated in accordance with the invention, in the manner described in more detail below, and the catalytic conversion of HC, CO and $NO_x$ components essentially occurs only in the three-way catalyzer 2' remote from the engine (Graphs $a_w$–$c_w$ in FIG. 2). In the case of very strict emission requirements, it is also possible to arrange two catalyzers 2' and 3' remote from the engine, as in FIG. 2, the catalyzer 2' being optimized for the reduction of $NO_x$ and the catalyzer 3', arranged downstream of the catalyzer 2' undertaking the oxidation of the remaining HC and CO exhaust gas pollutants.

For a better understanding, the invention is explained in more detail using the catalyzer design for oxidation catalyzers and three-way catalyzers which is widespread in motor vehicle technology.

Known catalyzers include a multi-cellular, ceramic monolith to which is applied a highly porous wash coat to increase the catalytically reactive surface. This wash coat consists of aluminum oxide in the γ phase (γ-$Al_2O_3$) and a mixture of stabilizers and promoters.

Stabilizers, mainly rare earth metals, such as cerium Ce, lanthanum La, barium Ba and their oxides, are added to prevent the crystal phase conversion of the highly-porous allotrophic modification γ-$Al_2O_3$ into the low porosity and less temperature-resistant allotrophic modification α-$Al_2O_3$ and, by this means, to maintain the highly-reactive surface and the temperature resistance of the wash coat. Promoters (for example Cd, nickel Ni) are used to support the catalytic conversion of HC and Co (oxidation catalyzers) or HC, CO and $NO_x$ (three-way catalyzers).

Catalytically active noble metals are dispersed in the wash coat, specifically platinum Pt and palladium Pd and Pt/Pd compounds being employed in a known manner for the catalytical support of the oxidation reaction of HC and CO (oxidation catalyzers) and rhodium Rh and Pt/Rh compounds being additionally used in a known manner for the catalytical support of the reduction reaction of $NO_x$ (three-way catalyzers). Further elements are contained in the wash coat, for example zirconium oxide $ZrO_2$, which prevents the catalyzer noble metals from sintering together at high temperatures.

It is the part of the wash coat which has the catalytically active noble metals dispersed on it, and which comes into contact with the exhaust gas, which forms the catalytically active layer of the catalyzer.

Oxidation catalyzers are normally employed for purifying exhaust gas with an over-stoichiometric composition (excess air, λ>1). The oxygen $O_2$ necessary for the oxidation of HC and CO is taken directly from the exhaust gas.

As is known, three-way catalyzers convert the pollutants HC, CO and $NO_x$ of the exhaust gas simultaneously and precisely in an optimum manner whenever the exhaust gas to be purified is present in the catalyzer with a stoichiometric composition (λ=1).

Due to the pulsating exhaust gas concentrations caused by the λ-control (concentration alternating between a slightly rich mixture λ<1 or a slightly lean mixture λ>1 with a pulsation frequency on the order of value of 1 Hz) in the immediate vicinity of exactly λ=1, it is functionally necessary for the λ-controlled three-way catalyzer to possess the capability of alternative adsorption and desorption of oxygen and, specifically, in such a way that in the case of a slightly lean mixture, oxygen is adsorbed and in the case of a slightly rich mixture, the previously adsorbed oxygen is desorbed so that, despite a slightly non-stoichiometric composition, the exhaust gas is presented, as exactly as is possible, as a stoichiometric mixture to the catalytically reactive layer itself.

One chemical element which has this required property of "intermediate storage" of oxygen is, for example, cerium which, as already mentioned, is used as a stabilizer and promotor in the catalytically reactive layer. Because of these flexible properties, cerium is widely used in catalyzer technology so that most catalyzers, and also in particular oxidation catalyzers, have a technology so that most catalyzers, and also in particular oxidation catalyzers, have a good capability for the intermediate storage of oxygen.

This oxygen storage capability is problematic, particularly in the case of starting catalyzers arranged near the engine, because when the engine is in the operationally warm condition, the exothermic conversion of HC and CO causes an average increase in temperature, on the order of value of 100° C. relative to the catalyzer inlet, of the catalyzer near the engine, in addition to the high exhaust gas temperature in the region near the engine. In small local regions of the catalyzer, the increase in temperature is, furthermore, considerably greater so that the ageing process of the starting catalyzer is greatly accelerated due to the overheating of the catalyzer near the engine during the entire operation of the engine in the warm condition. The increase in temperature due to the exothermic conversion of HC and CO also occurs to the same extent in the case of underbody catalyzers remote from the engine. In these, however, the basic thermal load is smaller because of the smaller heat quantity associated with the exhaust gas.

An essential feature of the method according to the present invention, and of the apparatus for carrying out the method, is that the alternative adsorption and desorption of oxygen is specifically avoided, especially in the case of starting catalyzers near the engine. This is because only HC and CO have to be oxidized—due to the small untreated $NO_x$ emission during the warming-up phase—the oxygen necessary for this oxidation being taken from the over-stoichiometric composition of the exhaust gas itself.

The alternative adsorption and desorption of oxygen is avoided in that the cerium employed in the catalytically active layer as stabilizer and promotor is replaced by other rare earth metals. The other rare earth metals, although they have a stabilizing effect for the allotrophic modification γ-$Al_2O_3$, have no capability or only a very slight capability for the alternative adsorption and desorption of oxygen. One example of a rare earth metal or a rare earth metal oxide with this desired property is lanthanum or lanthanum oxide, which is employed instead of cerium or cerium oxide. As a consequence, there is no worthwhile quantity of free oxygen for the oxidation of HC and CO available in the catalyzer near the engine in the case of a λ-controlled, stoichiometrical exhaust gas composition so that no oxidation or only very slight oxidation of HC and CO takes place in the catalyzer. The starting catalyzer near the engine is de-activated.

The first catalyzer (first in the exhaust gas flow direction) is preferably an oxidation catalyzer but it can, in principle, also be designed as a three-way catalyzer.

The first catalyzer, in particular in the embodiment as a starting catalyzer, is designed with a relatively small volume for rapid heating. The first catalyzer has, in order to achieve the lowest possible starting temperature, a relatively high proportion of Pd and/or Pt in the catalyzer noble metal dispersion. The stabilizer, based for example on lanthanum or lanthanum oxide, replaces the previously usual stabilizers based on cerium or cerium oxide.

The increase in temperature in the starting catalyzer due to the exothermic conversion of HC and CO during the cold starting phase is not critical with respect to the thermal load. This is because the starting catalyzer is, at worst, heated only slightly above the temperature of the exhaust gas of the operationally warm engine towards the end of the cold starting phase. Further, this occurs only for a short period before the starting catalyzer is de-activated by the initiation of the λ-control.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for purifying exhaust gases from an internal combustion engine having a catalyzer system which includes a first catalyzer and at least one second catalyzer arranged downstream of the first catalyzer, for the conversion of HC, CO and $NO_x$ exhaust gas constituents, said exhaust gases flowing through both catalyzers during an entire operating period of the internal combustion engine, the first catalyzer being suitable for at least a catalytic conversion of HC and CO exhaust gas constituents, the method comprising the steps of:

operating the first catalyzer over-stoichiometrically ($\lambda>1$) during a cold starting phase in order to reduce HC and CO emissions; and at least largely deactivating the catalytic conversion of the exhaust gas in the first catalyzer when the at least one second catalyzer reaches its operating temperature in which a λ-controlled, stoichiometric exhaust gas composition is used, the catalytic conversion occurring in the second catalyzer.

* * * * *